United States Patent
Vajapeyam

(10) Patent No.: US 9,940,170 B2
(45) Date of Patent: Apr. 10, 2018

(54) DYNAMICALLY MANAGING DISTRIBUTION OF DATA AND COMPUTATION ACROSS CORES FOR SEQUENTIAL PROGRAMS

(71) Applicant: Empire Technology Development LLC, Wilmington, DE (US)

(72) Inventor: Sriram Vajapeyam, Karnataka (IN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 1183 days.

(21) Appl. No.: 13/978,949

(22) PCT Filed: Mar. 1, 2013

(86) PCT No.: PCT/US2013/028765
§ 371 (c)(1),
(2) Date: Jul. 10, 2013

(87) PCT Pub. No.: WO2014/105106
PCT Pub. Date: Jul. 3, 2014

(65) Prior Publication Data
US 2014/0181837 A1 Jun. 26, 2014

(30) Foreign Application Priority Data
Dec. 24, 2012 (IN) .......................... 5371/CHE/2012

(51) Int. Cl.
*G06F 9/46* (2006.01)
*G06F 9/50* (2006.01)
*G06F 9/48* (2006.01)

(52) U.S. Cl.
CPC .......... *G06F 9/5033* (2013.01); *G06F 9/4856* (2013.01)

(58) Field of Classification Search
CPC .......................... G06F 9/5033; G06F 9/4856
See application file for complete search history.

(56) References Cited

U.S. PATENT DOCUMENTS

| 9,268,614 B2* | 2/2016 | Barsness | ............... G06F 9/4405 |
| 2010/0095300 A1* | 4/2010 | West | ..................... G06F 9/5016 718/104 |

(Continued)

OTHER PUBLICATIONS

Ankita Bhalla, Various Ways of Parallelization of Sequential Programs, IJERT, vol. 3, Issue 11, Jan. 2014.*

(Continued)

*Primary Examiner* — Lewis A Bullock, Jr.
*Assistant Examiner* — Kevin X Lu
(74) *Attorney, Agent, or Firm* — Turk IP Law, LLC

(57) ABSTRACT

Technologies are generally provided for dynamically managing execution of sequential programs in a multi-core processing environment by dynamically hosting the data for the different dynamic program phases in the local caches of different cores. This may be achieved through monitoring data access patterns of a sequential program initially executed on a single core. Based on such monitoring, data identified as being accessed by different program phases may be sent to be stored in the local caches of different cores. The computation may then be moved from core to core based on which data is being accessed, when the program changes phase. Program performance may thus be enhanced by reducing local cache miss rates, proactively reducing the possibility of thermal hotspots, as well as by utilizing otherwise idle hardware.

23 Claims, 7 Drawing Sheets

(56) References Cited

U.S. PATENT DOCUMENTS

| | | | |
|---|---|---|---|
| 2011/0067029 A1* | 3/2011 | Wolfe | G06F 9/505 718/102 |
| 2011/0258420 A1* | 10/2011 | Devadas, Sr. | G06F 9/3824 712/225 |
| 2013/0061237 A1* | 3/2013 | Zaarur | G06F 9/4856 718/105 |

OTHER PUBLICATIONS

Unknown Author, Cortex-A9, Technical Reference Manual, Capter 7.6, pp. 7-11, "Data Prefetching", Apr. 2010.*

International Search Report and Written Opinion for PCT/US2013/028765 filed on Mar. 1, 2013, dated Apr. 2, 2013.

Son et al., "A Compiler-Directed Data Prefetching Scheme for Chip Multiprocessors", PPoPP'09, Feb. 14-18, 2009.

Li et al., "Compiler-Assisted Data Distribution and Network Configuration for Chip Multiprocessors", Parallel and Distributed Systems, Issue 99, published on Dec. 6, 2011.

Rane et al., "Performance Optimization of Data Structures Using Memory Access Characterization", Cluster Computing (CLUSTER), pp. 570-574, Sep. 26-30, 2011.

Kamruzzaman et al., "Software Data Spreading: Leveraging Distributed Caches to Improve Single Thread Performance", PLDI' 10, Jun. 5-10, 2010.

Lis et al., "Shared Memory via Execution Migration", ASPLOS, Mar. 2011.

Lis et al., "Scalable directoryless shared memory coherence using execution migration", Technical Report MIT-CSAIL-TR-2010-053, Nov. 22, 2010.

Hardavellas et al., "Reactive NUCA: Near-Optimal Block Placement and Replication in Distributed Caches", Proc. of the 36th Annual International Symposium on Computer Architecture, Jun. 2009.

Chakraborty et al., "Computing Spreading: Employing Hardware Migration to Specialize CMP Cores On-the-fly", ASPLOS, Dec. 2006.

Rangan et al., "Thread Motion: Fine-Grained Power Management for Multi-Core Systems", OSCA, Jun. 20-24, 2009.

Wickizer et al., "Reinventing Scheduling for Multicore Systems", HotOS XII, May 2009.

"Programming Strategies for Multicore Processing: Pipelining", National Instruments, retrieved at http://wwvv.ni.com/white-paper/6425/en/, published on Dec. 6, 2011.

Brown et al., "Fast Thread migration via Cache Working Set Prediction", HPCA 2011, Feb. 2011.

"Victim Cache definition", Dictionary.com: The Free On-line Dictionary of Computing, Denis Howe, retrieved from the Internet on Jul. 9, 2013; <http://dictionary.reference.com/browse/victim+cache>.

* cited by examiner

COMPUTER PROGRAM PRODUCT 700

SIGNAL-BEARING MEDIUM 702

704 AT LEAST ONE OF

ONE OR MORE INSTRUCTIONS FOR MONITORING L2 MISSES AND/OR VICTIMS;
    ONE OR MORE INSTRUCTIONS FOR DETECTING A PHASE TRANSITION IN PROGRAM EXECUTION;
    ONE OR MORE INSTRUCTIONS FOR ASSIGNING DATA TO DIFFERENT SETS FOR FIRST DETECTION;
    ONE OR MORE INSTRUCTIONS FOR MOVING VICTIMS TO NEW CORE(S) FOR SUBSEQUENT DETECTIONS; AND
    ONE OR MORE INSTRUCTIONS FOR PREFETCHING DATA FOR NEXT PHASE TO TARGET CORE.

| COMPUTER-READABLE MEDIUM 706 | RECORDABLE MEDIUM 708 | COMMUNICATIONS MEDIUM 710 |

FIG. 7

DYNAMICALLY MANAGING DISTRIBUTION OF DATA AND COMPUTATION ACROSS CORES FOR SEQUENTIAL PROGRAMS

CROSS REFERENCE TO RELATED APPLICATIONS

This Application is the U.S. National Stage filing under 35 U.S.C. § 371 of International Application No. PCT/US13/028765, filed on Mar. 1, 2013, which claims priority under 35 U.S.C. § 119(a) and (h) to Indian Application No. 5371/CHE/2012, filed on Dec. 24, 2012. The disclosures of International Application No. PCT/US13/028765 and Indian Application No. 5371/CHE/2012 are hereby incorporated by reference in their entireties.

BACKGROUND

A multi-core microprocessor is one that combines two or more independent (micro)processors or processing units—called cores—into a single package, often a single integrated circuit (IC). A core or a single processor includes a CPU (Central Processing Units) and sufficient associated memory units to be able to independently execute a program or thread—viz., registers, TLB, Level-1 (L2) instruction and data caches, additional L2 caches, etc. For example, a dual-core device may include two independent microprocessors and a quad-core device may include four microprocessors. A multi-core microprocessor may implement multiprocessing in a single physical package. Cores in a multi-core device may share a single coherent cache and/or may have private (separate) caches. The processor cores may share the same interconnect to the rest of the system and to each other. Each "core" (a single microprocessor) may independently implement optimizations such as pipelining, superscalar execution, simultaneous multi-threading (SMT), multi-programming, etc. A multicore processor system with N cores may be more effective when it is presented with N or more threads concurrently, so as to keep each core busy with work.

Multi-core processors may pose a substantial performance challenge to sequential programs because sequential programs cannot typically utilize the multiple cores and may be restricted to executing on a single core. For certain workload classes, this limitation may also result in wasted hardware when there are not enough tasks (e.g., other sequential or parallel programs) to execute on the other cores or when the on-chip shared cache is unable to sustain other tasks.

Non object-oriented programs, especially legacy programs such as C programs, may have less modular data organization than object-oriented programs with respect to their computation structures (such as procedures) and data access patterns. However, these programs may also go through multiple phases of repetitive data access patterns during execution, typically resulting in local cache misses across the phase transitions.

The present disclosure appreciates the challenges in executing a sequential program on a computing device with a multi-core processor.

SUMMARY

The present disclosure generally describes methods, apparatuses, systems, devices, and/or computer program products related to dynamically managing the execution of a sequential program execution by distributing its data and computation across multiple cores.

According to some example embodiments, various methods for dynamically managing operation of sequential programs in a multi-core environment are described. Example methods may include monitoring data access patterns of a first phase of a sequential program initially executed on a first core of a multicore processor, determining that the sequential program has entered a second phase of execution based on the monitored data access patterns of the first phase of the sequential program, and/or after determining the sequential program has entered the second phase of execution, migrating the execution of the sequential program to a second core of the multicore processor.

According to other example embodiments, various methods for dynamically managing operation of sequential programs in a multi-core environment are described. Example methods may include monitoring data access patterns of a first phase of a sequential program initially executed on a first core of a multicore processor, determining that the sequential program has entered a second phase of execution based on the monitored data access patterns of the first phase of the sequential program, after determining the sequential program has entered the second phase of execution loading data associated with cache victims of the first core to a local cache of a second core of the multi-core processor, and/or monitoring data access patterns of the second phase of the sequential program on the first core. The methods may further include determining that the sequential program has re-entered the first phase of execution based on the monitored data access patterns of the second phase of the sequential program and/or after determining the sequential program has re-entered the first phase of execution, migrating execution of the sequential program to the second core of the multicore processor.

According to further example embodiments, various multi-core processors configured to dynamically manage execution of a sequential program are described. Example processors may include a shared cache and a plurality of cores including at least a first core and a second core, each of the first and second cores including a private cache and at least one of the plurality of cores configured to operate a helper thread. The helper thread may monitor data access patterns of a first phase of a sequential program initially executed on a first core of a multicore processor, determine that the sequential program has entered a second phase of execution based on the monitored data access patterns of the first phase of the sequential program, and/or after determining the sequential program has entered the second phase of execution, migrate the execution of the sequential program to a second core of the multicore processor.

According to yet other example embodiments, various multi-core processors configured to dynamically manage operation of sequential programs in a multi-core environment are described. Example processors may include a shared cache and a plurality of cores including at least a first core and a second core, each of the first and second cores including a private cache and at least one of the plurality of cores configured to operate a helper thread. The helper thread may monitor data access patterns of a first phase of a sequential program initially executed on a first core of a multicore processor, determine that the sequential program has entered a second phase of execution based on the monitored data access patterns of the first phase of the sequential program, and/or after determining the sequential program has entered the second phase of execution load data associated with cache victims of the first core to a local cache of a second core of the multi-core processor. The processors may further monitor data access patterns of the second phase of the sequential program on the first core; determine that the sequential program has re-entered the first phase of execution based on the monitored data access patterns of the second phase of the sequential program; and/or after determining the sequential program has re-entered the first phase of execution, migrate execution of the sequential program to the second core of the multicore processor.

According to further example embodiments, computer-readable storage media with instructions stored thereon which, when executed, dynamically manage execution of sequential programs in a multi-core environment are described. The instructions on an example computer-readable storage medium may perform a method when executed, where method is substantially similar to the method described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
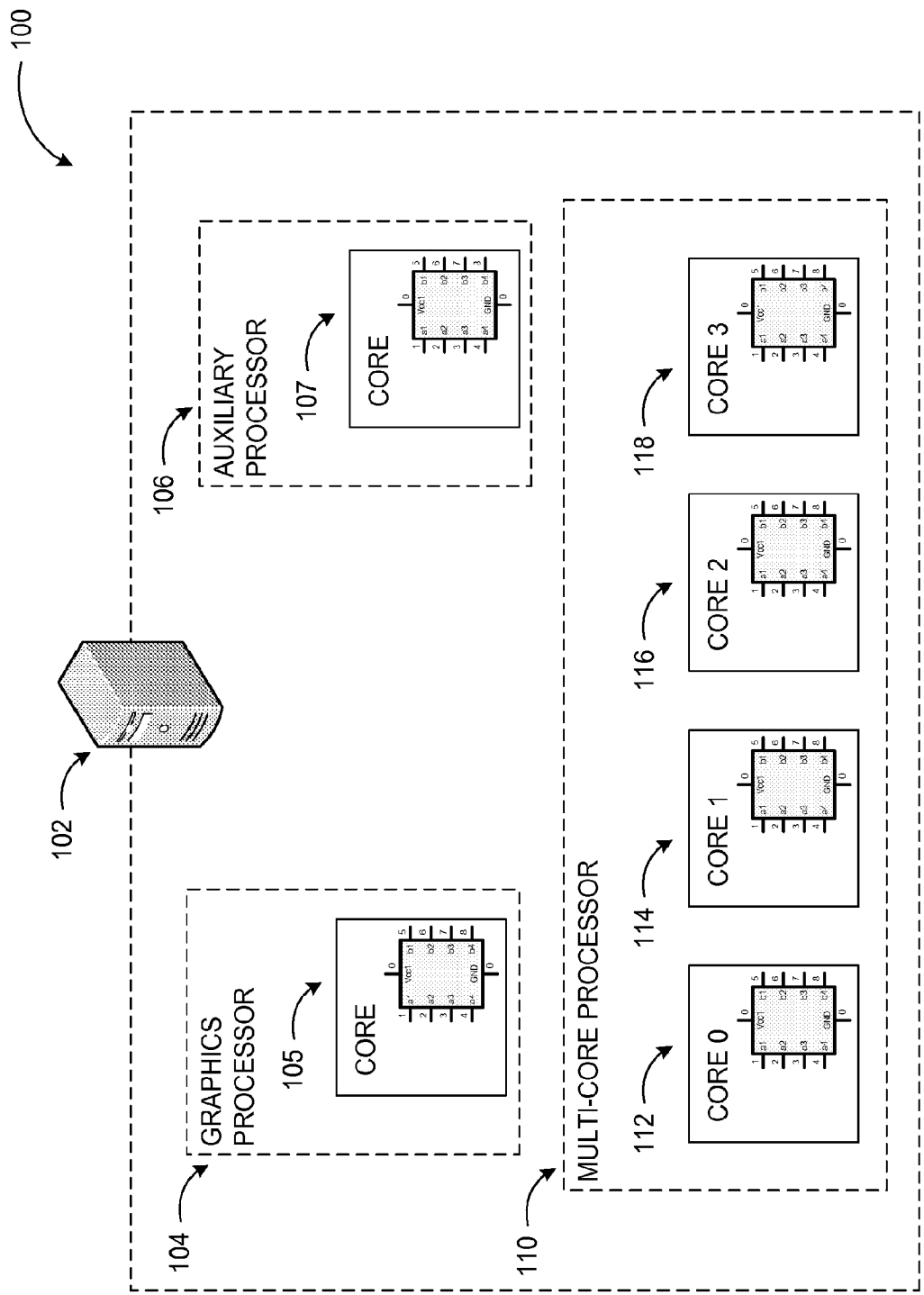
FIG. 1 illustrates an example computing device with a multi-core processor, where execution of sequential programs may be dynamically managed through distribution of data and computation across cores.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and/or computer program products related to dynamically managing sequential programs by distributing data and computation across cores.

Briefly stated, technologies are generally provided for dynamically managing execution of sequential programs in a multi-core processing environment by dynamically hosting data for the different dynamic program phases in the local caches of different cores. This may be achieved through monitoring data access patterns of a sequential program initially executed on a single core. Based on such monitoring, data identified as being accessed by different program phases may then be stored in the local caches of different cores. Such monitoring may be carried out by executing a helper thread on the same core or another core of a multi-core processor. Computation may then be moved from core to core based on which data is being accessed, when the program changes phase. Program performance may thus be enhanced by reducing local cache miss rates, proactively reducing the possibility of thermal hotspots, as well as by utilizing otherwise idle hardware.

In different embodiments, multi-core processor hardware may be optionally enhanced with special support for exposing the memory access details of the program thread (such as L2 cache miss addresses, program counter (PC) values of the instructions that caused those cache misses, L1 & L2 cache hit addresses and/or their respective instruction PC values, etc.) to a helper thread, which may be executed on the same core or on another core. This may enable the helper thread to more effectively monitor the program thread.

FIG. 1 illustrates an example computing device with a multi-core processor, where execution of sequential programs may be dynamically managed through distribution of data and computation across cores, arranged in accordance with at least some embodiments described herein.

As shown in diagram 100, the processor block of computing device 102 may include any number of cores in its main processor 110 (multi-core processor), for example four. Core 0 (112), core 1 (114), core 2 (116), and core 3 (118) may process separate threads in parallel increasing the performance of the system. In addition to the main processor 110, other processing resources may include auxiliary processor 106 with its core 107, graphics processor 104 with its core 105, and similar ones. Some of the cores may be dedicated to perform specific (predefined) processes, while others may be multi-purpose. A scheduler (not shown) may schedule threads for the processor cores based on a priority assigned by the owner application. A multi-core system according to embodiments may also include per-processor queues (PPQs) associated with each core such that threads with fixed affinity can be placed in respective cores by the scheduler.

Multi-core systems, which are becoming increasingly popular, may provide many advantages in terms of processor power, efficiency, and the like. Furthermore, the close proximity of multiple cores 112, 114, 116, and 118 on the same die may allow the cache coherency circuitry to operate at a much lower latency than is possible if the signals have to travel off-chip. Combining equivalent processors on a single die may substantially enhance the performance of cache snoop operations. This means that signals between different processors travel shorter distances, and therefore those signals may travel faster and degrade less. These higher quality signals may allow more data to be sent in a given time period since individual signals can be shorter and may not need to be repeated as often.

Assuming that the die can fit into the package, physically, the multi-core CPU designs may need substantially less Printed Circuit Board (PCB) space compared to multi-chip designs. Also, a dual-core processor may consume comparatively less power than two coupled single-core processors, principally because of the increased power to drive signals external to the chip and because the smaller silicon process geometry may allow the cores to operate at lower voltages. Moreover, the cores may share some circuitry, like the shared cache and the interface to the front side bus (FSB).

Software may also benefit from multi-core architectures, where code can be executed in parallel. Under most common operating systems, the code may be executed in separate threads or processes. Each application executed on a system may execute in its own core-scheduling process through separate threads so multiple applications may benefit from multi-core architectures. Each application may also have multiple threads, but code may have to be specifically written to utilize multiple threads. As discussed above, a relatively large number of legacy programs may be designed to be executed sequentially in a single thread preventing them from taking advantage of the benefits of multi-core processing environments.

In a system according to some embodiments, program performance may be enhanced by reducing local cache miss rates, reducing the possibility of thermal hotspots, or by utilizing otherwise idle hardware. A helper thread may be employed in some example embodiments to monitor data access patterns of a sequential program initially executed on a core and to move the different portions of the data accessed by the program to the caches of other cores and to subsequently move computation of the sequential program to another core when data needed for operation by the sequential program is located in a local cache of the other core.

A sequential program refers to any software application, to be executed on a processor, that includes all its machine instructions in a single thread and process, wherein the instructions logically follow each other in a sequence; this is as opposed to the program being executed in parallel by multiple threads or processes. Such a sequential program can execute on a single processor core unless special techniques are employed by the underlying system (i.e., hardware and runtime software) to enable the sequential program to execute on multiple cores either one after another or in parallel.

While the example system in FIG. 1 has been described with specific components such as main processor, auxiliary processor, and graphics processor, embodiments are not limited to this system of the example components and configurations. A computing device with dynamic management of distribution of data and computation across cores for sequential programs may be implemented in other systems and configurations employing fewer or additional components using the principles described herein.

Figure 2:
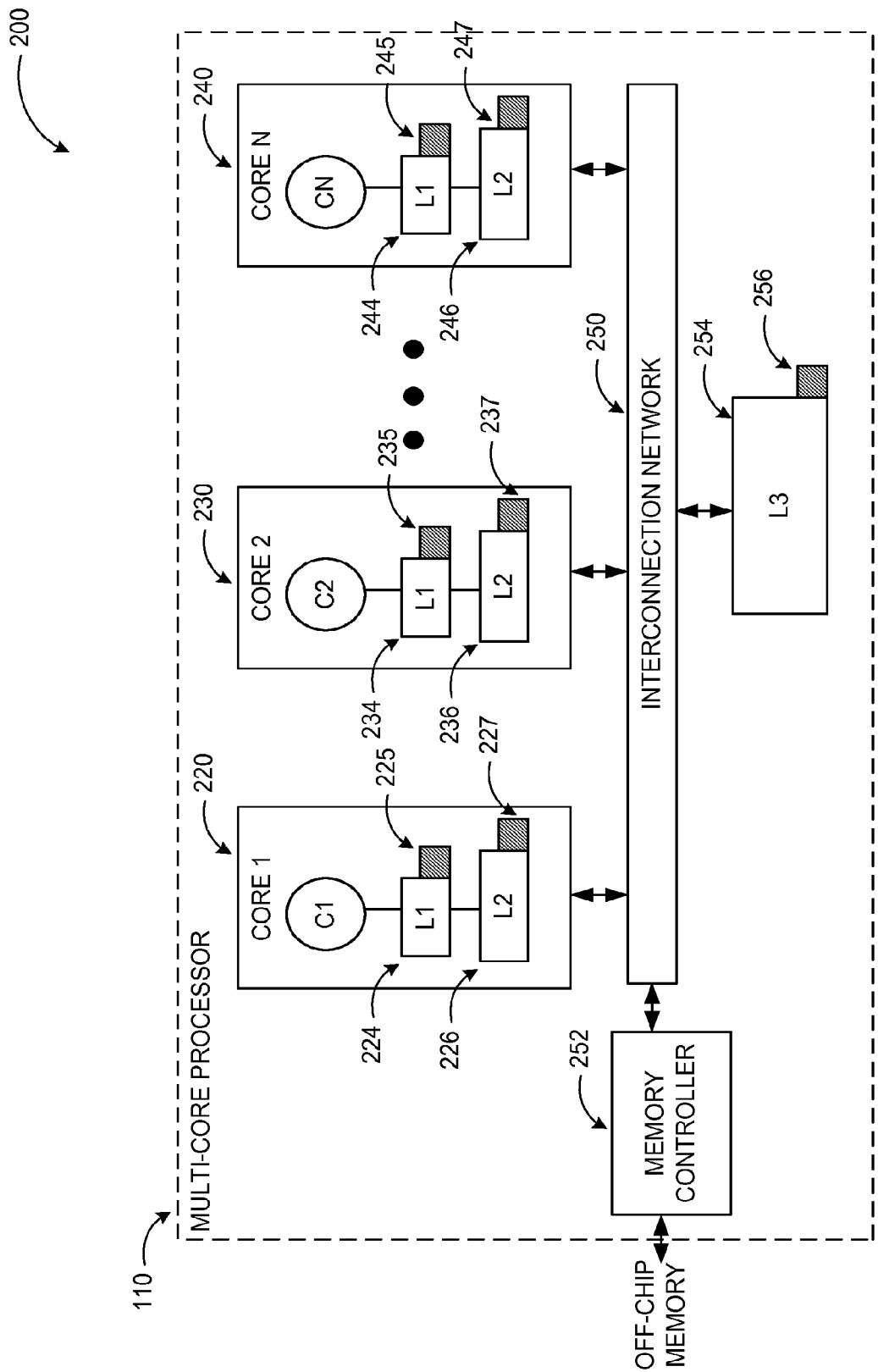
FIG. 2 illustrates an example multi-core processor, where execution of sequential programs may be dynamically managed through dynamic distribution of data and computation across cores.

FIG. 2 illustrates an example multi-core processor, where execution of sequential programs may be dynamically managed dynamic distribution of data and computation across cores, arranged in accordance with at least some embodiments described herein.

Diagram 200 includes a multi-core processor 110 with example cores 1, 2, through N (220, 230, and 240). Each core includes two layers of respective private cache memory (L1 and L2) with their respective cache controllers (L1 224, cache controller 225 and L2 226, cache controller 227 for core 1 220; L1 234, cache controller 235 and L2 236, cache controller 237 for core 2 230; and L1 244, cache controller 245 and L2 246, cache controller 247 for core N 240). The cores may communicate via interconnection network 250, which may also be coupled to shared cache memory 254 and its cache controller 256, as well as memory controller 252 for managing off-chip memory.

In some examples, memory controller 252 may be coupled to cache memory 254 (be physically proximate to L3). The memory controller may be activated when a memory reference misses in all on-chip caches, including L3, and then the memory reference may have to go off-chip, via the memory controller, to DRAM main memory that is controlled by the memory controller 252.

When a processor needs to read from or write to a location in main memory, it may first check whether a copy of that data is in the cache memory. If so, the processor may immediately read from or write to the cache, which is relatively much faster than reading from or writing to physical main memory. Modern CPUs have at least three independent caches: an instruction cache to speed up executable instruction fetch, a data cache to speed up data fetch and store, and a translation look-aside buffer (TLB) to speed up virtual-to-physical address translation for both executable instructions and data. The data cache levels may be generally classified into private (L1, L2) and shared (L3) caches. Some processors may have private L1 and shared L2; others may have private L1 and L2 and shared L3. Some processors may have no private cache and only a shared cache. Some processors may have multiple levels of private caches and multiple levels of shared caches.

In some embodiments, the private cache may only include one level (L1). However, in other embodiments, the private cache may be a two-level or multi-level cache (e.g. L1 and L2), in which case, the L2 cache victims are observed, and the property of inclusion is assumed. For practical implementations, an assumption may be made that the property of inclusion is maintained between the L1 and L2 caches of a core, so that when a block (or a cache line) is removed from the L2 it is also removed from the L1, simplifying cross-core coherence. Data sets may usually not be cleanly partitioned across program phases, resulting in some needed data being in a remote core (e.g., core 1) and some on the local core (e.g., core 4). In this scenario, two implementations may be considered: (1) standard cache coherence may move or provide a copy of the remote data to the local core; (2) a cache-once policy may ensure that the remote data stays in core 1 but is served to core 4, so as to reduce redundancy across cores. Thread movement from core to core may be implemented in a number of ways. The helper thread may implement sophisticated phase detection and data set identification algorithms because it may be a full-fledged thread executed on a core and there may be plenty of execution cycles between phase transitions. Given this potentially complex nature of the helper thread, the helper thread may also act as a prefetcher that pushes data for a next phase of the executed program to suitable core. Indeed, for the remote core that is going to execute the next program phase, the helper thread executing on the local core may appear as a prefetch engine. The power and energy consumption of the helper thread may be offset by the resultant cache hit gains of the main program.

A cache miss refers to a failed attempt to read or write a piece of data in the cache, which may result in a lower-level cache access or, in the case of the last-level cache, a main memory access, with much higher latency. A victim cache is a cache used to hold blocks evicted from any cache upon replacement of those blocks in the cache by other blocks. The victim cache may reside between the main cache and its refill path, and hold blocks that were evicted from the main cache. The victim cache may usually be fully associative, and may be intended to reduce the number of conflict misses. The victim cache may be useful because blocks that are evicted from the cache are likely to be reused again in the near future, hence it may be desirable to hold them in the victim cache rather than sending them off to the next lower-level cache or main memory.

Multi-core processor 110 may support shared-memory multiprocessing via a coherence protocol. Assuming a sequential program is initially executed on core 1 (220), the data access patterns of the program may be tracked and data continually distributed across the other cores 2 through N (230, 240) so as to maximize cache hits, moving the computation to the core containing the data it currently needs.

Figure 3:
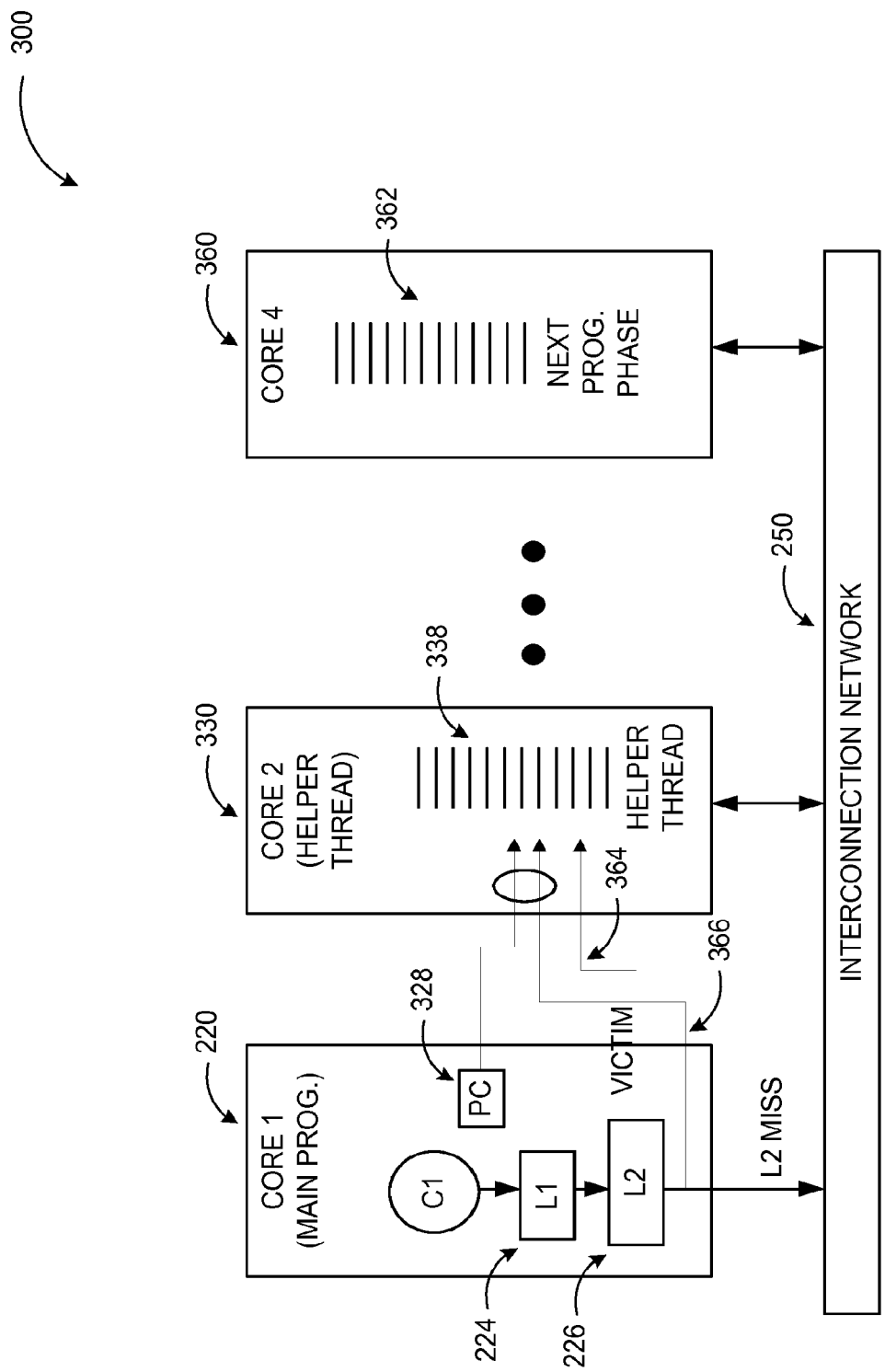
FIG. 3 illustrates an example configuration for dynamic management of sequential programs through distribution of data and computation across cores, where a helper thread is implemented on a physically proximate core to the core executing the program.

FIG. 3 illustrates an example configuration for dynamic management of sequential programs through distribution of data and computation across cores, where a helper thread is implemented on a core that is physically close to the core executing the program, arranged in accordance with at least some embodiments described herein.

Diagram 300 shows example cores 1, 2, and 4 (220, 330, and 360) connected through the interconnection network 250. Core 1 (220) may be executing the main sequential program using the private cache memories L1 224 and L2 226. For each memory access generating instruction, a program counter (PC) value 328 of that instruction may be noted such that PC values generating L2 cache misses can be known. Further, the memory address value 366 and the current cache line displaced by the reference (victim value 364) may also be noted such that different data sets of the program may be identified. A helper thread 338 for monitoring the data access patterns and moving data to other cores (e.g., core 4 360) may execute on core 2 (330). In some examples, the second core may be selected based on one or more of: a power consumption, a desired speed, a device type, a sequential program type, and/or a complexity of the sequential program.

In a system according to some embodiments, tracking the data access patterns may be accomplished off the critical path of program execution by the helper thread 338 that has access to the memory references made by the program (i.e., helper thread 338 residing on core 2 (330) instead of on core 1 (220)). Yet, the helper thread 338 may execute in simultaneously-multi-threaded mode on the same core 1 (220), on a neighbor core 2 (330), or on a dedicated core (not shown) that is physically close to the core executing the main program. In either case, the helper thread 338 may have access to either every or a statistically sampled subset of the L2 cache miss 366 and every L2 cache victim 364 of the program executed on core 1 (220). In some examples, the helper thread 338 may also have access to either all or statistically sampled subsets of the PC value 328 that generated the L2 cache miss.

In some embodiments, the helper thread 338 may skip information from an initial warm-up phase of the first core's L2 cache and then start monitoring the L2 misses and/or victims to determine data belonging to different phases of the program. The helper thread may be a computer program that performs analysis of the private cache misses and/or victims to identify program phase changes. The helper thread may utilize a pattern matching algorithm, a machine learning algorithm, support vector machine techniques, data mining algorithms, data stream mining algorithms, simple statistical methods, or other techniques to analyze the private cache misses and/or victims. The helper thread may track data access statistics at different and arbitrary levels of granularity that it constructs based on its monitoring of the program thread. For example, it may detect that data addresses 0 to (1024-1) are accessed in a particular manner, addresses 99,484 to 103,284 are accessed in a different manner, and so on, and partition these into data subsets D0, D1, etc.

Further, the helper thread may detect that whenever D0 is accessed, D1 is likely to be accessed next, but D4 is never accessed simultaneously, and so on. In some cases, D8 may correspond to a physical page P1 of the main memory system, but D12 may span multiple pages P8 through P11 whereas D21 maybe only a subset of page P93. In general, the helper thread may employ any algorithms, heuristics, and techniques that enable the use of data access addresses, corresponding PC addresses, data access time in terms of program execution milestones, or cache miss information into actionable intelligence for detecting program phase transitions, detecting data set transitions, and thereupon moving data and/or the program from one core to another. The helper thread may also detect data access patterns and prefetch or push data to a different core, i.e., it may proactively push data to a different core well before that core needs the data. For example, when the program thread causes a lot of L2 misses as it shifts phase from P1 to P2, the helper thread may push all the victim cache lines (corresponding to data for phase P1) to core 4 in anticipation that the program thread will revisit phase P1 in the near future, at which point the program thread will be moved to core 4. The helper thread may thus move the execution of a sequential program from a first core to a second core, when it detects a phase transition and availability of the data for the second phase in the second core.

Once the helper thread 338 has identified data sets accessed by different program phases, it may contact peer helper threads on other cores to move or load some of the data sets to those cores (e.g., for a next program phase 362). For example, when the program transitions from its initial phase to a second phase, the execution may trigger a number of L2 cache misses and L2 cache victims. The helper thread 338 may identify the victims as belonging to phase 1 of the program and move them to, for example, core 4. Subsequently, when the program revisits phase 1 and starts generating L2 cache misses, the helper thread 338 may detect the phase transition by observing the L2 cache miss addresses and the PC values generating those misses. It may then move execution of the program to core 4. When the helper thread 338 detects the program as having completed phase 1 and revisiting phase 2, it may move the program back to core 1 yielding higher local cache hit rates for the program, and thus enhanced performance.

According to some examples, loading data into a remote core's local caches may be performed in two ways. In one example approach, victim cache lines of a first core may be sent to a second core by the helper thread over the interconnection network, suitably marked as being destined for that second core. This approach may involve an enhancement to the cache coherence protocol such that other devices connected to the network ignore such traffic, and at the same time the target core may pick up the traffic. In another example approach, prefetch requests may be issued by a helper thread with the destination of the prefetch being a remote core's local cache. Here again the interconnection network and cache coherence protocol may be enhanced to allow for marking of such requests with a target, so that the shared cache or the memory controller supply the prefetched data to the target and not to the helper thread. The target cache controller may also be enhanced to accept such prefetch data that are pushed to it without it having explicitly requested the data.

Figure 4:
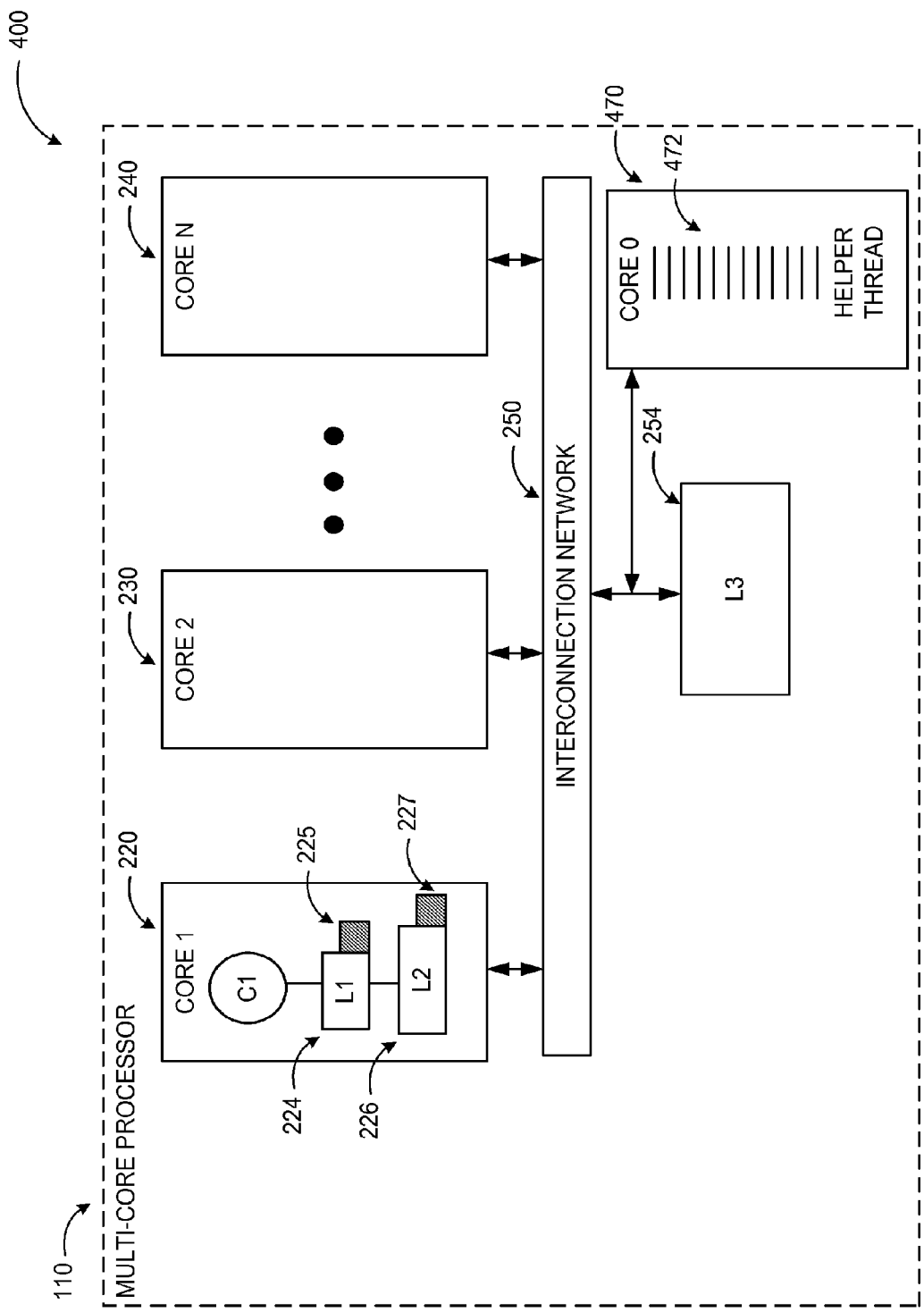
FIG. 4 illustrates another example configuration for dynamic management of sequential programs through distribution of data and computation across cores, where the helper thread is implemented on a dedicated core physically proximate to the shared L3 cache and having special hardware to monitor all traffic to/from the L3 cache.

FIG. 4 illustrates another example configuration for dynamic management of sequential programs through distribution of data and computation across cores, where the helper thread is implemented on a dedicated core physically proximate to the shared L3 cache and having special hardware to monitor all traffic to/from the L3 cache, arranged in accordance with at least some embodiments described herein.

The alternative configuration of multi-core processor 110 in diagram 400 includes cores 1 through N (220, 230, and 240) coupled together via interconnection network 250. Private caches of core 1 (224 and 226) with their respective cache controllers 225 and 227 are also shown. In the example configuration of diagram 400, a dedicated core 0 (470) executing helper thread 472 is shown along with shared cache memory 254.

In some embodiments, as shown in diagram 400, the helper thread 472 may be executed on the dedicated core 470, which is close to the shared cache memory 254 and is dedicated just to monitoring L2 cache misses (and writes of dirty L2 victim cache line) that arrive at the shared cache memory 254. Traffic arriving at shared cache memory 254 may be tagged with the identifier of the requesting core, for example core 1 (220), and/or the identifier of the requesting thread of the requesting core. The helper thread 472 may be able to monitor all L2 cache misses of all the programs executed on the multi-core main processor 110, and may thus be able to make global decisions about data distribution and shared use of the cores.

While the example processors in FIG. 2 through 4 have been described with specific cores and memories, embodiments are not limited to the example components and configurations. A multi-core processor with dynamic management of distribution of data and computation across cores for sequential programs may be implemented in other configurations employing fewer or additional components using the principles described herein.

Figure 5:
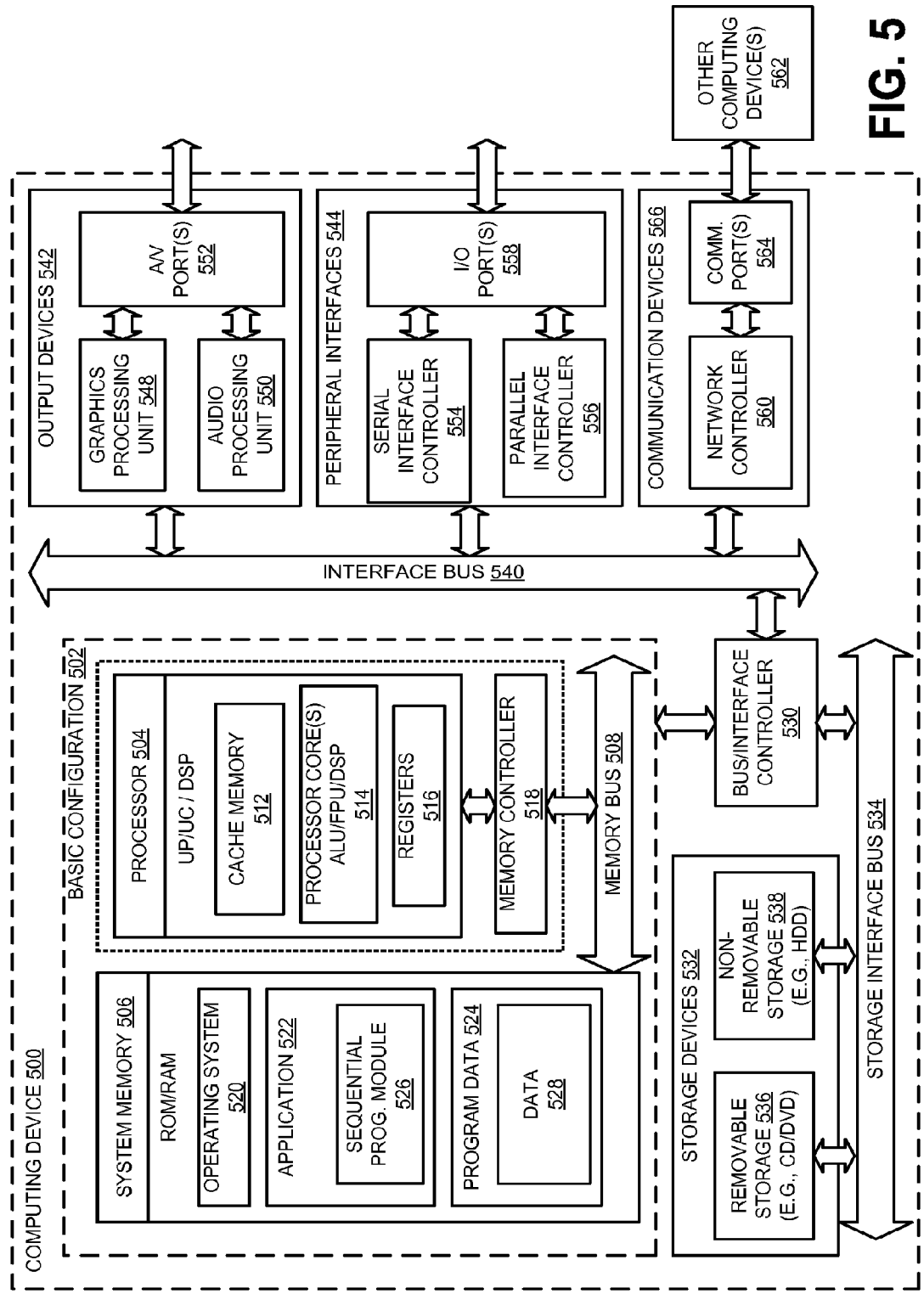
FIG. 5 illustrates a general purpose computing device, where execution of sequential programs may be dynamically managed through distribution of data and computation across cores.

FIG. 5 illustrates a general purpose computing device, where execution of sequential programs may be dynamically managed through distribution of data and computation across cores, arranged in accordance with at least some embodiments described herein. For example, the computing device 500 may be used as a server, desktop computer, portable computer, smart phone, special purpose computer, or similar device such as the computing device 102 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The application 522 may include a sequential program module 526, which may be an integral part of the application 522 or a separate application on its own. In executing the sequential program module 526, the processor 504 may dynamically manage the execution by monitoring private cache misses and/or victims, and distributing the computation and data across different cores employing a helper thread, as described herein. The program data 524 may include, among other data, data 528 related to the execution of the sequential program module 526, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Figure 6:
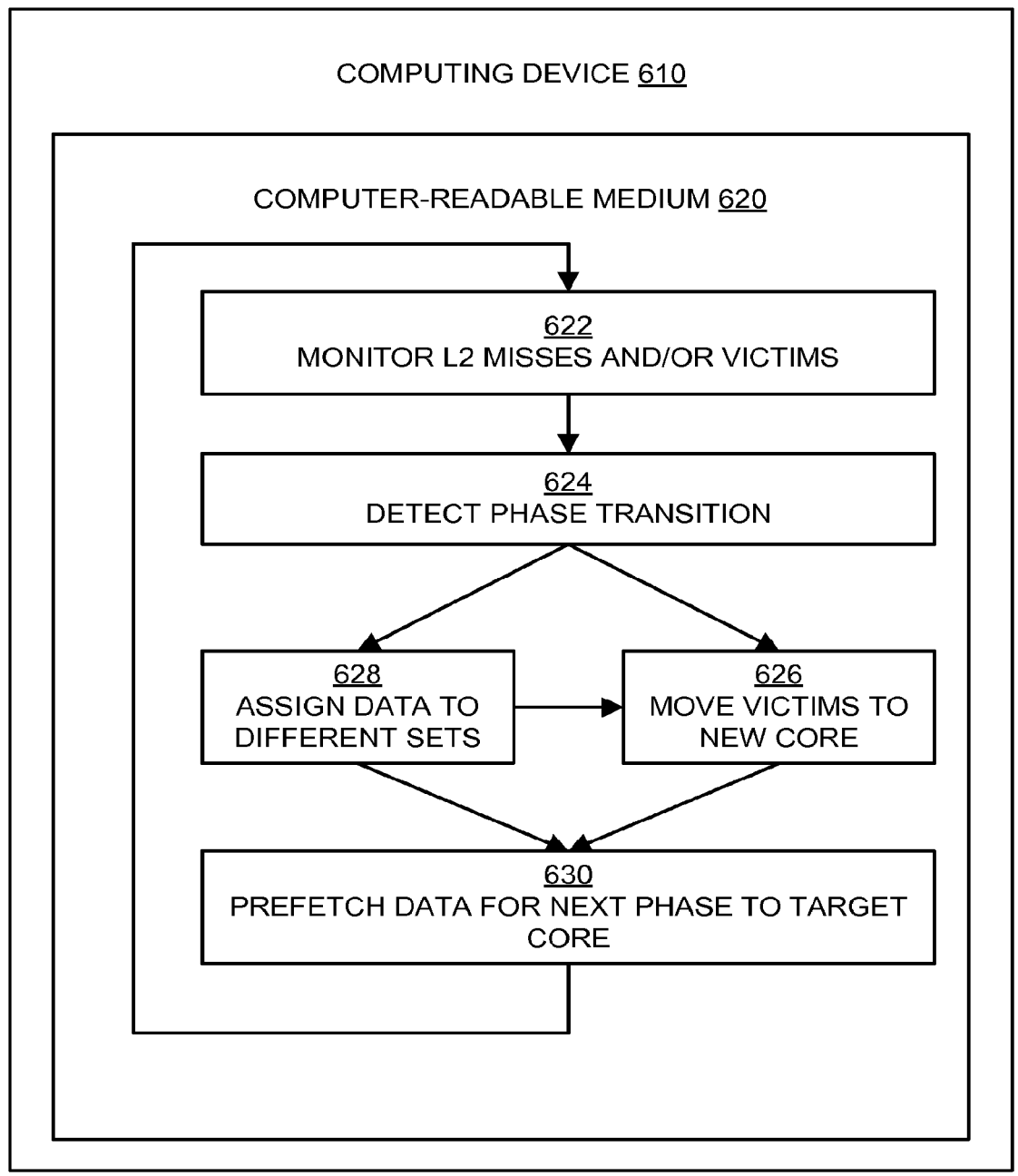
FIG. 6 is a flow diagram illustrating an example method that may be performed by a computing device such as the computing device in FIG. 5.

FIG. 6 is a flow diagram illustrating an example method that may be performed by a computing device such as the computing device in FIG. 5, arranged in accordance with at least some embodiments described herein. Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process for dynamically managing distribution of data and computation across cores for sequential programs may begin with block 622, "MONITOR L2 MISSES AND/OR VICTIMS", where a helper thread, for example, the helper thread 338 of FIG. 3 may monitor data access patterns of a program executed on a core (e.g., core 1 (220) of FIG. 2). The helper thread may reside on the same core as the executed program or on another core). The monitored data access patterns may include L2 cache misses and/or victims in some examples.

Block 622 may be followed by block 624, "DETECT PHASE TRANSITION", where the helper thread 338 may detect a phase transition in the executed sequential program. The phase transition may involve data sets to be accessed that are not present in the core's L2, and are possibly present on another core's L2 cache if data sets have been previously identified and distributed across cores, else are present in either the L3 or main memory. Thus, the data access patterns may indicate a partitioning of data sets, and also a core location of data that is needed for subsequent operation by the sequential program.

Block 624 may be followed by either one of the blocks 626 or 628, "MOVE VICTIMS TO NEW CORE" or "ASSIGN DATA TO DIFFERENT SETS", or both, where the helper thread, upon identifying data sets accessed by different program phases, may contact its peer helper threads on other cores (e.g., core 4 (360) of FIG. 3) to move some of the data sets to those cores. For example, when the program transitions from its initial phase to a second phase it may trigger a number of L2 cache misses and, thereby, L2 cache victims. The helper thread may detect a program phase change by determining the proportion of cache misses to be above some threshold TO, whereas typically within a program phase the cache miss proportion may be a small amount such 0.1. Upon phase change detection, the helper thread may identify data as belonging to different data sets by detecting patterns in the memory addresses of the cache misses. For example, it may identify the entire set of cache miss addresses during the phase transition as belonging to a new data set D4. Or, based on prior history, it may identify only a subset of those memory addresses as belonging to new data set D4 and the rest as belonging to an already identified data set D3.

In addition, or alternatively, the helper thread may identify the victims as belonging to another data set D0 accessed by the just-concluded phase P0 of the program and move them to, for example, the local cache of core 4 (360) rather than to the shared cache L3. Subsequently, when the program revisits the same phase P0 and starts generating L2 cache misses to D0, the helper thread 338 may detect the phase transition to P0 by observing the L2 cache miss addresses and the program counter (PC) values generating those misses, and move the program to core 4 that holds the data set D0 for that phase P0. On core 4, subsequently, when the helper thread detects the program as having completed the phase P0 and revisiting a third phase P7, it may move the execution of the program back to a core where the other phase P7 was executed.

Blocks 626 and 628 may be followed by block 630, "PREFETCH DATA FOR NEXT PHASE TO TARGET CORE", where the helper thread 338 may act as a prefetcher that pushes data for a next phase to the core associated with that phase. When the helper thread moves victims to a new core, it is acting as a data prefetcher for that new core, since the new core may subsequently be assigned to execute the program phase that will access the moved victims. In addition, based on its observation of the program having shifted from phase P0 to phase P1, say, the helper thread may anticipate a future phase shift of the program to P2 and start pushing the data set say D31 that will be accessed by P2 to another core 7 that may execute P2. Such prefetching (or pushing) of data is done by the helper thread issuing memory references to the shared cache L3, the responses to those references being directed to core 7 rather than to the helper thread.

For the remote core that is going to execute the next program phase, the local core's helper thread may resemble a prefetch engine. The additional power consumption of the helper thread may be offset by the resultant cache hit gains of the main sequential program due to dynamically managing distribution of data and computation across cores.

The blocks included in the above described process are for illustration purposes. Dynamically managing distribution of data and computation across cores for sequential programs may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 7 illustrates a block diagram of an example computer program product, arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, a helper thread executed on one or more of the cores may undertake one or more of the tasks shown in FIG. 7 in response to the instructions 704 conveyed to the processor 504 by the medium 702 to perform actions associated with dynamically managing distribution of data and computation across cores for sequential programs as described herein. Some of those instructions may include, for example, instructions for monitoring L2 misses and/or victims, detecting a phase transition in program execution, assigning data to different sets upon first detection, moving victims to new core(s) upon subsequent detections, and prefetching (or pushing) data for next phase to target core according to some embodiments described herein. In addition, upon detecting a phase transition, the 700 may further detect that the data required for the new phase is already present in the local cache of a second core, and thereupon arrange to move the main program from the first core to the second core, by contacting either the operating system or the helper thread of the second core for this purpose.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 of FIG. 5 by an RF signal bearing medium, where the signal bearing medium 702 is conveyed by the wireless communications medium 710 (e.g., a wireless communications medium conforming with the IEEE 802.11 standard).

According to some example embodiments, various methods for dynamically managing operation of sequential programs in a multi-core environment are described. Example methods may include monitoring data access patterns of a first phase of a sequential program initially executed on a first core of a multicore processor, determining that the sequential program has entered a second phase of execution based on the monitored data access patterns of the first phase of the sequential program, and/or after determining the sequential program has entered the second phase of execution, migrating the execution of the sequential program to a second core of the multicore processor.

According to other example embodiments, migrating the execution may include loading data associated with the second phase of the sequential program in a private cache associated with the second core of the multi-core processor and moving the execution of the sequential program to the second core. Loading data associated with the second phase of the sequential program may include prefetching data associated with the second phase to the private cache of the second core.

According to further example embodiments, determining that the sequential program has entered the second phase of execution may include analyzing data access patterns during the execution of the sequential program utilizing one or more of a pattern recognition technique, a machine learning technique, a support vector machine, a neural network technique, or combinations thereof. Determining that the sequential program has entered the second phase of execution may also include determining by a helper thread executed on one of the first core, the second core, or a third core.

According to yet other example embodiments, the method may include monitoring data access patterns of the second phase of the sequential program executing on the second core of the multi-core processor; determining that the sequential program has re-entered the first phase of execution based on the monitored data access patterns of the second phase of the sequential program; and/or after determining the sequential program has re-entered the first phase of execution, migrating the execution of the sequential program to the first core of the multicore processor.

According to yet further example embodiments, monitoring the data access patterns of the first phase of the sequential program may include observing private cache miss addresses and PC values that generate the private cache misses on the first core. Monitoring data access patterns may include monitoring the data access patterns by operating a helper thread that has access to memory references made by the sequential program. The method may further include operating the helper thread on the first core, the second core that is proximate to the first core, or a dedicated core. The method may also include operating the helper thread on the dedicated core that is proximate to a shared cache and/or selecting the second core based on one or more of: a power consumption, a desired speed, a device type, a sequential program type, and/or a complexity of the sequential program.

According to other example embodiments, various methods for dynamically managing operation of sequential programs in a multi-core environment are described. Example methods may include monitoring data access patterns of a first phase of a sequential program initially executed on a first core of a multicore processor, determining that the sequential program has entered a second phase of execution based on the monitored data access patterns of the first phase of the sequential program, after determining the sequential program has entered the second phase of execution loading data associated with cache victims of the first core to a local cache of a second core of the multi-core processor, and/or monitoring data access patterns of the second phase of the sequential program on the first core. The methods may further include determining that the sequential program has re-entered the first phase of execution based on the monitored data access patterns of the second phase of the sequential program and/or after determining the sequential program has re-entered the first phase of execution, migrating execution of the sequential program to the second core of the multicore processor.

According to further example embodiments, various multi-core processors configured to dynamically manage execution of a sequential program are described. Example processors may include a shared cache and a plurality of cores including at least a first core and a second core, each of the first and second cores including a private cache and at least one of the plurality of cores configured to operate a helper thread. The helper thread may monitor data access patterns of a first phase of a sequential program initially executed on a first core of a multicore processor, determine that the sequential program has entered a second phase of execution based on the monitored data access patterns of the first phase of the sequential program, and/or after determining the sequential program has entered the second phase of execution, migrate the execution of the sequential program to a second core of the multicore processor.

According to some example embodiments, the helper thread may also load data associated with the second phase of the sequential program in a private cache associated with the second core of the multi-core processor and/or instruct the second core to continue execution of the sequential program on the second core. To load the data, the helper thread may prefetch data associated with the second phase to the private cache of the second core. To determine that the sequential program has entered the second phase of execution, the helper thread may analyze data access patterns during the execution of the sequential program utilizing one or more of a pattern recognition technique, a machine learning technique, a support vector machine, a neural network technique, or combinations thereof.

According to further example embodiments, the helper thread may be executed on the first core, the second core, or a third core. The helper thread may further monitor data access patterns of the second phase of the sequential program executing on the second core of the multi-core processor; determine that the sequential program has re-entered the first phase of execution based on the monitored data access patterns of the second phase of the sequential program; and/or after determining the sequential program has re-entered the first phase of execution, migrate the execution of the sequential program to the first core of the multicore processor.

According to yet other example embodiments, the helper thread may monitor data access patterns of the first phase of the sequential program by observing private cache miss addresses and PC values that generate the private cache misses on the first core. To monitor the data access patterns, the helper thread may monitor the data access patterns by operating a helper thread that has access to memory references made by the sequential program. The helper thread may be operated on the first core, the second core that is proximate to the first core, and/or a dedicated core. The helper thread may also be operated on the dedicated core that is proximate to a shared cache. The helper thread may further select the second core based on one or more of a power consumption, a desired speed, a device type, a sequential program type, and/or a complexity of the sequential program.

According to yet other example embodiments, various multi-core processors configured to dynamically manage operation of sequential programs in a multi-core environment are described. Example processors may include a shared cache and a plurality of cores including at least a first core and a second core, each of the first and second cores including a private cache and at least one of the plurality of cores configured to operate a helper thread. The helper thread may monitor data access patterns of a first phase of a sequential program initially executed on a first core of a multicore processor, determine that the sequential program has entered a second phase of execution based on the monitored data access patterns of the first phase of the sequential program, and/or after determining the sequential program has entered the second phase of execution load data associated with cache victims of the first core to a local cache of a second core of the multi-core processor. The processors may further monitor data access patterns of the second phase of the sequential program on the first core; determine that the sequential program has re-entered the first phase of execution based on the monitored data access patterns of the second phase of the sequential program; and/or after determining the sequential program has re-entered the first phase of execution, migrate execution of the sequential program to the second core of the multicore processor.

According to further example embodiments, computer-readable storage media with instructions stored thereon which, when executed, dynamically manage execution of sequential programs in a multi-core environment are described. The instructions on an example computer-readable storage medium may perform a method when executed, where method is substantially similar to the method described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executed on one or more computers (e.g., as one or more programs executed on one or more computer systems), as one or more programs executed on one or more processors (e.g. as one or more programs executed on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof.

Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to dynamically manage operation of sequential programs in a multicore environment, the method comprising:
   monitoring, by a helper thread, data access patterns of a first phase of execution of a sequential program that is initially executed on a first core of a multicore processor, wherein monitoring the data access patterns includes monitoring private cache misses and private cache victims of the sequential program that is initially executed on the first core;
   moving data associated with a second phase of execution of the sequential program, from the first core of the multicore processor to a second core of the multicore processor, before the sequential program enters the second phase of execution;
   determining, by the helper thread based on analysis of the monitored data access patterns of the first phase of execution of the sequential program, that the sequential program has entered the second phase of execution;
   determining availability of the data, for the second phase of execution of the sequential program, in the second core; and
   in response to determining that the sequential program has entered the second phase of execution and that the data is available, for the second phase of execution of the sequential program, in the second core, migrating the execution of the sequential program to the second core for the execution of the second phase of the sequential program on the second core.

2. The method according to claim 1, wherein:
   moving the data comprises loading the data associated with the second phase of execution of the sequential program in a private cache associated with the second core, and
   migrating the execution comprises moving the execution of the sequential program to the second core to enable use of the data loaded in the private cache for the execution by the second core.

3. The method according to claim 2, wherein loading the data associated with the second phase of the sequential program comprises:
   prefetching the data associated with the second phase of execution of the sequential program to the private cache of the second core.

4. The method according to claim 1, wherein determining, by the helper thread, that the sequential program has entered the second phase of execution comprises:
   determining, by a helper thread that is executed on one of the first core, the second core, or a third core of the multicore processor, that the sequential program has entered the second phase of execution.

5. The method according to claim 1, further comprising:
   monitoring data access patterns of the second phase of execution of the sequential program that is executing on the second core;
   determining that the sequential program has re-entered the first phase of execution based on the monitored data access patterns of the second phase of execution of the sequential program; and
   in response to determining that the sequential program has re-entered the first phase of execution, migrating the execution of the sequential program to the first core of the multicore processor.

6. The method according to claim 1, wherein monitoring, by the helper thread, the data access patterns of the first phase of execution of the sequential program comprises:
   observing program counter (PC) values that generate the private cache misses on the first core.

7. The method according to claim 1, wherein monitoring, by the helper thread, the data access patterns of the first phase of execution of the sequential program comprises:
   monitoring the data access patterns by operating a helper thread that has access to memory references made by the sequential program.

8. The method according to claim 7, wherein operating the helper thread comprises:
   operating the helper thread on one of: the first core, the second core that is proximate to the first core, and a dedicated core.

9. The method according to claim 1, further comprising:
   selecting the second core based on one or more of: a power consumption, a particular speed, a device type, a sequential program type, or a complexity of the sequential program.

10. A multicore processor configured to dynamically manage execution of a sequential program, the multicore processor comprising:
    a shared cache; and
    a plurality of cores that include at least a first core and a second core, wherein each of the first core and the second core includes a private cache, and wherein at least one of the plurality of cores is configured to operate a helper thread to:
    monitor data access patterns of a first phase of execution of the sequential program that is initially executed on the first core, wherein the monitored data access patterns include patterns in memory addresses of private cache misses of the sequential program that is initially executed on the first core, wherein the patterns in the memory addresses of the private cache misses include data sets that correspond to the memory addresses of the private cache misses, and wherein the data sets include data sets that are accessed by the sequential program in a second phase of execution;
    move data associated with the second phase of execution of the sequential program, from the first core of the multicore processor to the second core of the multicore processor, before the sequential program enters the second phase of execution;

determine, based on analysis of the monitored data access patterns of the first phase of execution of the sequential program, that the sequential program has entered the second phase of execution;

determine that the data, for the second phase of execution of the sequential program, is available in the second core;

in response to the determination that the sequential program has entered the second phase of execution and that the data is available, for the second phase of execution of the sequential program, in the second core, migrate the execution of the sequential program to the second core;

monitor data access patterns of the second phase of execution of the sequential program that is executed on the second core of the multicore processor;

determine, based on the monitored data access patterns of the second phase of execution of the sequential program, that the sequential program has re-entered the first phase of execution; and in response to the determination that the sequential program has re-entered the first phase of execution, migrate the execution of the sequential program to the first core.

11. The multicore processor according to claim 10, wherein:
to move the data associated with the second phase of execution of the sequential program, the at least one of the plurality of cores is configured to operate the helper thread to load the data associated with the second phase of execution of the sequential program in a private cache associated with the second core, and
to migrate the execution of the sequential program to the second core, the at least one of the plurality of cores is configured to operate the helper thread to instruct the second core to continue execution of the sequential program on the second core.

12. The multicore processor according to claim 11, wherein to load the data, the at least one of the plurality of cores is configured to operate the helper thread to:
prefetch the data associated with the second phase of execution of the sequential program to the private cache of the second core.

13. The multicore processor according to claim 10, wherein the at least one of the plurality of cores is configured to operate the helper thread to:
monitor data access patterns of the first phase of execution of the sequential program by observation of program counter (PC) values that generate the private cache misses on the first core.

14. The multicore processor according to claim 10, wherein the helper thread has access to memory references made by the sequential program.

15. The multicore processor according to claim 14, wherein the helper thread is operated on one of: the first core, the second core that is proximate to the first core, and a dedicated core.

16. The multicore processor according to claim 15, wherein the helper thread is operated on the dedicated core that is proximate to the shared cache.

17. The multicore processor according to claim 10, wherein the at least one of the plurality of cores is further configured to operate the helper thread to:
select the second core based on one or more of: a power consumption, a particular speed, a device type, a sequential program type, or a complexity of the sequential program.

18. A non-transitory computer-readable storage medium having instructions stored thereon to, in response to execution by a multicore processor, dynamically manage operation of sequential programs in a multicore environment, the instructions being executable to perform or cause to be performed operations comprising:
monitor, by a helper thread, data access patterns of a first phase of execution of a sequential program that is initially executed on a first core of a multicore processor, wherein the monitored data access patterns include patterns in memory addresses of private cache misses of the sequential program that is initially executed on the first core, wherein the patterns in the memory addresses of the private cache misses includes data sets that correspond to the memory addresses of the private cache misses, and wherein the data sets include data sets that are accessed by the sequential program in a second phase of execution;
move data associated with the second phase of execution of the sequential program, from the first core of the multicore processor to a second core of the multicore processor, before the sequential program enters the second phase of execution;
determine, by the helper thread based on analysis of the monitored data access patterns of the first phase of execution of the sequential program, that the sequential program has entered the second phase of execution;
determine that the data, for the second phase of execution of the sequential program, is available in the second core;
responsive to the determination that the sequential program has entered the second phase of execution and that the data is available, for the second phase of execution of the sequential program, in the second core, migrate the execution of the sequential program to a second core of the multicore processor;
monitor data access patterns of the second phase of execution of the sequential program that is executed on the second core of the multicore processor;
determine, based on the monitored data access patterns of the second phase of execution of the sequential program, that the sequential program has re-entered the first phase of execution; and
responsive to the determination that the sequential program has re-entered the first phase of execution, migrate the execution of the sequential program to the first core.

19. The non-transitory computer-readable storage medium according to claim 18, wherein:
the operation to move the data associated with the second phase of execution of the sequential program comprises at least one operation to load the data associated with the second phase of execution of the sequential program in a private cache associated with the second core of the multicore processor, and
the operation to migrate the execution of the sequential program to the second core comprises at least one operation to move the execution of the sequential program to the second core to enable use of the data loaded in the private cache for the execution by the second core.

20. The non-transitory computer-readable storage medium according to claim 19, wherein the operation to load the data associated with the second phase of execution of the sequential program comprises at least one operation to:

prefetch the data associated with the second phase of execution of the sequential program to the private cache of the second core.

21. The non-transitory computer-readable storage medium according to claim 18, wherein the operation to determine that the sequential program has entered the second phase of execution comprises at least one operation to:
   determine, by the helper thread which is executed on one of the first core, the second core, or a third core of the multicore processor, that the sequential program has entered the second phase of execution.

22. The non-transitory computer-readable storage medium according to claim 18, wherein the operation to monitor the data access patterns of the first phase of execution of the sequential program comprises at least one operation to:
   observe program counter (PC) values that generate the private cache misses on the first core.

23. The non-transitory computer-readable storage medium according to claim 18, wherein the helper thread has access to memory references made by the sequential program.

* * * * *